United States Patent Office 3,268,392
Patented August 23, 1966

3,268,392
ISOTHIOURONIUM HALIDE NEMATOCIDE
Everett E. Gilbert, Morris Township, Morris County, N.J., assignor to Allied Chemical Corporation, New York, N.Y., a corporation of New York
No Drawing. Filed Jan. 6, 1965, Ser. No. 423,858
10 Claims. (Cl. 167—22)

The present invention relates to a process for treating soil infested with nematodes.

At least five hundred different kinds of plants are known to be attacked by nematodes, including practically all plants grown in greenhouses in the United States. Plants infested by nematodes will present a weakened, sickly appearance without visible injury to the stem or any part of the plant above ground. An examination of the roots will show numerous knots or galls characterized by a swollen appearance. In cases of severe infestation, gall formation not only reduces the size and effectiveness of the root system, but also seriously affects other plant parts so that unless treated the plant dies.

Although a variety of nematocides have been proposed in the past, these materials possess disadvantages in their inability to eliminate all forms of the nematode population and possess certain degrees of undesired phytotoxicity. For example, fumigants such as ethylene dibromide, dichloropropene-dichloropropane mixture and chloropicrin are chemicals extensively used as nematocides on a commercial scale. These fumigants are phytotoxic to such an extent, however, that it is necessary to treat the soil several weeks prior to planting of a crop in order that the fumigant may leave the soil.

Accordingly, it is an object of the present invention to provide a method of treating nematode-infested soil with a toxic quantity of a nematocide which is capable of thoroughly permeating the soil, capable of exterminating all forms of nematode population and of imparting no phytotoxic effects to plants in the area of the treated soil.

It has now been discovered that control of nematodes may be effected by treating nematode-infested soil with a toxic quantity of an S-aliphatic isothiouronium halide nematocide having the structural formula

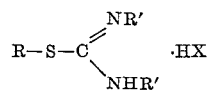

wherein R is an aliphatic hydrocarbon group having from 8 to 18 carbon atoms, preferably 10 to 12 carbon atoms, R' is hydrogen or lower alkyl and X is either chlorine or bromine. R in the above formula may be a saturated or unsaturated aliphatic hydrocarbon or mixture of saturated and/or unsaturated aliphatic hydrocarbon groups. These groups include, for example, straight or branched chain alkyl, alkenyl and alkynyl radicals. The aliphatic hydrocarbon groups herein contemplated include alkyl radicals such as octyl, decyl, dodecyl, tetradecyl, pentadecyl, hexadecyl, heptadecyl and octadecyl; alkenyl radicals such as octadecenyl, octadecadienyl and octadecatrienyl; and alkynyl radicals such as octadecynyl, dodecynyl and octadecatriynyl. Compounds wherein R in the above formula is a straight chain aliphatic hydrocarbon group have been found to exhibit especial nematocidal properties. Compounds wherein R is a mixture of saturated and/or unsaturated aliphatic hydrocarbon groups may be derived from animal and vegetable oil fatty acids like soybean oil, cotton seed oil, coconut oil, tallow, etc. Lower alkyl groups representative of R' include methyl, ethyl, isopropyl and n-butyl.

Representative compounds included within the scope of the above structural formula include:

S-n-dodecylisothiouronium bromide
S-n-decylisothiouronium bromide
S-n-decylisothiouronium chloride
S-n-dodecylisothiouronium chloride
S-n-octylisothiouronium chloride
S-n-octylisothiouronium bromide
S-n-octadecylisothiouronium chloride
S-n-octadecylisothiouronium bromide
S-n-decyldiethylisothiourium chloride
S-n-decyldiethylisothiouronium bromide
S-n-dodecyldiisopropylisothiouronium chloride
S-n-dodecyldiisopropylisothiouronium bromide
S-n-dodecynylisothiouronium chloride
S-n-dodecynylisothiouronium bromide
S-n-dodecynyldiethylisothiouronium chloride
S-n-dodecynyldiethylisothiouronium bromide
S-"Coco" [a] isothiouronium chloride
S-"Coco" [a] isothiouronium bromide The compounds of the present invention may be produced by any conventional manner known in the art. Generally, reaction of an aliphatic halide with thiourea or a symmetrical dialkyl thiourea will give the desired S-aliphatic isothiouronium halide. Preferably, equimolar quantities of aliphatic halide and thiourea compound are refluxed in an inert solvent such as toluene to yield the desired S-aliphatic isothiouronium halide which may be recovered by crystallization. These compounds are solids and, when pure, are obtained as fine white, odorless crystals. They are freely soluble in water and ethanol and generally insoluble in diethyl ether and benzene.

The S-aliphatic isothiouronium halides may be introduced into the soil "as is" or in a variety of nematocidal compositions. The nature of these compositions will depend primarily upon the particular composition contemplated. The compositions may be applied to the nematode-infested soil in any conventional manner as by spraying, drenching or dusting. The term "soil" as used herein is intended to include any medium capable of supporting the growth of plants. It is therefore intended to include, in addition to soil, humus, manure, compost, sand and artificial plant growth media including hydroponic media.

In a preferred embodiment of the invention, the S-aliphatic isothiouronium halides are distributed in the soil by introduction in water such as that employed to irrigate the soil. In this procedure the amount of water may be varied in accordance with the moisture content and the moisture equivalent of soil in order to obtain the desired depth of distribution of the toxic compound.

The S-aliphatic isothiouronium halides described above may also be formulated as dust or granular compositions containing carriers or fillers such as talc, sand, fuller's earth, chalk, gypsum, etc., including active ingredients such as fertilizers, insecticides and fungicides. The S-aliphatic isothiouronium halides may be used for controlling nematodes in either pre-emergence or post-emergence treatments without substantially affecting crops planted or growing in the soil. Control of nematodes by use of the non-phytotoxic S-aliphatic isothiouronium halides of this invention has been found to improve the growth characteristics of plants, thereby enabling production of crops having more luxuriant tops and roots and a greater total weight than those obtained from untreated soil.

The S-aliphatic isothiouronium halides are effective as nematocides when distributed in the infested soil at a ---
[a] Mixture of aliphatic hydrocarbon radicals as derived from coconut oil acids.

dosage of at least 50 pounds per acre and preferably between about 100 to 300 pounds per acre. In order to obtain complete eradication of the undesired nematodes, it is desirable that the soil be impregnated with the S-aliphatic isothiouronium halide to a depth of at least about 6 inches. It will be understood by those skilled in the art that minimal dosages are preferred when concerned with post-emergent treatments.

The following examples illustrate the invention, but are not to be construed as limiting the same.

*Example 1*

The nematocidal activity of representative S-aliphatic isothiouronium halides of this invention was determined by a procedure essentially as described by Schuldt and Bluestone in "Contributions of the Boyce Thompson Institute," 19, 65 (1957). *Panagrellus redivivus* (Linné) nematode culture was added to an aqueous solution containing 1 to 50 parts per million of S-aliphatic isothiouronium halide, and observations were made after the period of time indicated in the table below. The test apparatus consisted of four (two tops and two bottoms) Petri dishes (size 69 mm. x 15 mm. placed within a larger Petri dish (size 150 mm. x 20 mm.). This arrangement allowed testing of a single dosage of the compound with four replicates or testing of two dosages with only two replicates in each large Petri dish. The results were recorded as estimated percentage kill of nematodes. The results are given in the following table:

TABLE I

| Compound | Percent kill | | | | | | | | |
|---|---|---|---|---|---|---|---|---|---|
| | 1 day | | | 2 days | | | 5 days | | |
| | 50 p.p.m. | 25 p.p.m. | 10 p.p.m. | 50 p.p.m. | 25 p.p.m. | 10 p.p.m. | 50 p.p.m. | 25 p.p.m. | 10 p.p.m. |
| (1) S-n-dodecylisothiouronium bromide | 95 | 95 | 95 | 100 | 100 | 100 | 100 | 100 | 100 |
| (2) S-n-decylisothiouronium bromide | 95 | 95 | 95 | 100 | 100 | 100 | 100 | 100 | 100 |
| (3) S-n-decylisothiouronium chloride | 100 | 99 | 80 | 100 | 100 | 100 | 100 | 100 | 100 |
| (4) S-n-dodecylisothiouronium chloride | 100 | 99 | 99 | 100 | 100 | 100 | 100 | 100 | 100 |
| (5) "Mylone" a | 95 | 95 | 50 | 100 | 100 | 90 | 100 | 100 | 100 |
| (6) "Vapam" b | 95 | 95 | 95 | 100 | 100 | 100 | 100 | 100 | 100 |
| (7) "Nemagon" c | 0 | 0 | 0 | 10 | 0 | 0 | 25 | 0 | 0 |
| (8) Control | 0 | 0 | 0 | 0 | 0 | 0 | 0 | 0 | 0 | a A commercial nematocide comprising dimethyltetrahydrothiadiazine thione.
b A commercial nematocide comprising N-methyl dithiocarbamate dihydrate.
c A commercial nematocide comprising 1,2-dibromo-3-chloropropane.

It is evident from the above table that the nematocides of the present invention are at least as toxic or more toxic to nematodes at equivalent dosages than commercially available nematocides.

*Example 2*

A post-emergent test was conducted by spraying S-n-dodecylisothiouronium bromide and S-n-decylisothiouronium bromide as aqueous solutions on soil around nematode-infested andromeda plants (*Pieris japonica*) at a dosage of 200 pounds per acre. Soil samples were taken 12 months after treatment and examined as follows: Approximately 200 grams of soil were screened to remove roots and stems. This screened sample was extracted by the standard Baermann funnel technique for 24 hours. At the end of this period, 50 cc. of liquid was withdrawn and agitated. A 5 cc. portion of the extracted liquid was transferred to a Syracuse watch glass which had been marked off into 8 sections for counting purposes. Nematodes present in the samples were counted under a binocular microscope using 30 magnification. The number of nematodes counted was multiplied by ten. The data obtained are given below.

TABLE II

Toxicants: Number of nematodes found per 200 grams of soil
S-n-dodecylisothiouronium bromide _____ 100
S-n-decylisothiouronium bromide _____ 40
Untreated check _____ 330

No phytotoxic effect or injury to the andromeda plants was noted.

*Example 3*

A test similar to that described in Example 2 was carried out on nematode-infested Rosebud variety of azalea plants. A dosage of 150 pounds per acre was applied in September and repeated the following May. Soil samples were taken 4 months after the second treatment and were examined as set forth above. The following results were obtained.

TABLE III

Toxicants: Nematodes per 5 cc. aliquot
S-n-dodecylisothiouronium bromide _____ 54
S-n-decylisothiouronium bromide _____ 44
Untreated check _____ 180

No injury to the azalea plants was observed.

The S-aliphatic isothiouronium halides of the present invention were found to permit normal germination in growth when applied to nematode-infested tomatoes, corn, squash, okra, beans, boxwood, arborvitae, yew, barberry, fringe tree and viburnum at concentrations up to about 1,000 pounds per acre.

It will be understood that any of the S-aliphatic isothiouronium compounds described as within the scope of the present invention can be used in place of the compounds illustrated in the above tests.

While in the foregoing specification this invention has been described in relation to certain specific embodiments thereof and details have been set forth for the purpose of illustration, it will be apparent to those skilled in the art that the invention is adaptable to other embodiments and many of the details set forth herein can be varied considerably without departing from the basic concept of the invention.

I claim:

1. A process for controlling nematodes which comprises treating nematode-infested soil with a toxic quantity of a compound having the structural formula

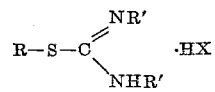

wherein R is an aliphatic hydrocarbon group having from 8 to 18 carbon atoms, R' is a member selected from the group consisting of hydrogen and lower alkyl and X is a member selected from the group consisting of chlorine and bromine.

2. A process as defined in claim 1 wherein R is a straight chain aliphatic hydrocarbon group having 10 to 12 carbon atoms.

3. A process as defined in claim 1 wherein R' is hydrogen and X is chlorine.

4. A process as defined in claim 1 wherein R' is hydrogen and X is bromine.

5. A process as defined in claim 1 wherein the compound employed is S-n-dodecylisothiouronium bromide.

6. A process as defined in claim 1 wherein the compound employed is S-n-decylisothiouronium bromide.

7. A process as defined in claim 1 wherein the compound employed is S-n-decylisothiouronium chloride.

8. A process as defined in claim 1 wherein the compound employed is S-n-dodecylisothiouronium chloride.

9. A process as defined in claim 1 wherein the compound is employed at a dosage of at least about 50 pounds per acre.

10. A process as defined in claim 1 wherein the compound is employed at a dosage of about 100 to 300 pounds per acre.

References Cited by the Examiner
UNITED STATES PATENTS

| | | | |
|---|---|---|---|
| 2,980,578 | 4/1961 | Abramitis | 167—22 |
| 3,093,666 | 6/1963 | Du Brow | 167—22 |

OTHER REFERENCES

Bandelin et al.: J. of the American Chemical Society, vol. 74, Sept. 5, 1962, pp. 4271 to 4273.

JULIAN S. LEVITT, *Primary Examiner.*

J. D. GOLDBERG, *Assistant Examiner.*